United States Patent
Foth et al.

(10) Patent No.: US 7,899,758 B2
(45) Date of Patent: Mar. 1, 2011

(54) PREREGISTERED TRACKING LABELS

(75) Inventors: Thomas J. Foth, Trumbull, CT (US); Richard W. Heiden, Huntington, CT (US); Cindy Mangiameli, Southbury, CT (US); Brian M. Romansky, Monroe, CT (US); Kevin Lockwood, Toms River, NJ (US)

(73) Assignee: Pitney Bowes Inc., Stamford, CT (US)

( * ) Notice: Subject to any disclaimer, the term of this patent is extended or adjusted under 35 U.S.C. 154(b) by 2190 days.

(21) Appl. No.: 10/851,781

(22) Filed: May 21, 2004

(65) Prior Publication Data

US 2004/0243522 A1 Dec. 2, 2004

Related U.S. Application Data

(60) Provisional application No. 60/474,169, filed on May 29, 2003.

(51) Int. Cl.
*G06Q 30/00* (2006.01)
(52) U.S. Cl. ........ 705/333
(58) Field of Classification Search ........ 705/1, 14
See application file for complete search history.

(56) References Cited

U.S. PATENT DOCUMENTS

| | | | | |
|---|---|---|---|---|
| 5,314,176 A * | 5/1994 | Schmitt | | 270/1.03 |
| 5,421,778 A * | 6/1995 | Kouramanis | | 462/2 |
| 6,047,264 A * | 4/2000 | Fisher et al. | | 705/26 |
| 6,130,613 A * | 10/2000 | Eberhardt et al. | | 340/572.7 |
| 2003/0112972 A1 * | 6/2003 | Hattick et al. | | 380/46 |
| 2004/0215480 A1 * | 10/2004 | Kadaba | | 705/1 |
| 2007/0299686 A1 * | 12/2007 | Hu et al. | | 705/1 |

* cited by examiner

*Primary Examiner* — Gabrielle McCormick
(74) *Attorney, Agent, or Firm* — Brian A. Collins; Charles M. Malandra, Jr.

(57) ABSTRACT

The present invention overcomes the disadvantages of the prior art by enabling a sender to easily and automatically track mail. The foregoing is accomplished by first requiring the sender to register the sender's acquisition and possession of a booklet of tracking labels. Sender may indicate to the system the nature of the automated tracking sender wishes (delivery only, failure only, mailing events forwarding, etc.) Sender may override the system for specific mail. Sender is in possession of the labels contained in the booklet which may be wrapped with tamper evidencing material, may register the labels by entering the booklet security code as well as the first sequential label tracking code in a system. The booklet security code is not obtained until the tampering evidencing material is opened.

18 Claims, 6 Drawing Sheets

PREREGISTERED TRACKING LABELS

This Application claims the benefit of the filing date of U.S. Provisional Application No. 60/474,169 filed May 29, 2003, which is owned by the assignee of the present Application.

FIELD OF THE INVENTION

The invention relates generally to tracking items and, more particularly, to methods for tracking mail.

BACKGROUND OF THE INVENTION

Previously, when a sender wanted to track letter, flats, or packages, (hereinafter referred to as "mail"), the sender attached a tracking sticker to the mail. The sender recorded the tracking number that appeared on the tracking sticker before the mail was sent. In some cases, the tracking label provided a receipt, which made it easier to remember this information, but in all cases, it was necessary for the sender to "pull" the information by entering the tracking number into a computer system to track the mail. Typically, the tracking number had 22 digits; thus, someone had to be careful to enter the correct tracking number.

If a postage meter was used for the payment of the postage of the mail, the operator of the meter would enter the tracking label number into the meter, and the meter would upload information to a database. Then the operator would log onto a system and enter an account number that would indicate all the mail that was recorded for that meter and all the mail that was processed under that Postage-By-Phone account number. One of the problems with the foregoing procedure is that the operator would receive a list of all of the mail received from the meter.

Currently, carriers are placing serialized tracking numbered labels at outlets that may be obtained by senders. One of the difficulties of the foregoing is that nefarious people may record the serialized tracking numbered labels and utilize the tracking numbers to track other peoples' mail.

Another disadvantage of the prior art is that a nefarious person may predict the serialized tracking number and use the number to track mail in an authorized fashion.

A further disadvantage of the prior art is that, in tracking systems that utilize predicable serialized tracking numbers and which allow exclusive tracking for the first person who enters the tracking label number permit nefarious people to disable the utility of the system by registering predictable blocks of numbers since the tracking numbers have a predictable order.

An additional disadvantage of the prior art is that, when carriers include accounting information on the label and use the label to facilitate the payment of mail, nefarious people may enter known account numbers which will redirect the payment of items mailed to unsuspecting carrier account holders.

Another disadvantage of the prior art is that the sender is not able to specify in which medium the sender would receive notification of the status of the tracked mail.

SUMMARY OF THE INVENTION

The present invention overcomes the disadvantages of the prior art by enabling a sender to easily and automatically track mail. The foregoing is accomplished by first requiring the sender to register his/her acquisition and possession of a booklet of tracking labels. Senders may indicate to the system the nature of the automated tracking they wish (delivery only, failure only, mailing events forwarding, etc.) Senders may override the system for specific mail. Senders in possession of the labels contained in the booklet which may be wrapped with tamper evidencing material may register the labels by entering the booklet security code as well as the first sequential label tracking code. The booklet security code is not obtained until the tampering evidencing material is opened.

Senders would obtain booklets of labels that allow them to continue to either provide a receipt or from the page to a ledger type page that remains in the book when the label is removed from the page. In the case of tracking systems that do not provide the full destination address, the users may enter only the information necessary to remember the destination of the mail. For forms such a bills of lading used with shipping systems, this information is residual, retained by the customer by means of NCR or carbon paper. This information also may be recorded online.

Before the first use of the book of labels, the sender goes to an online system to register the labels as being "owned" by them. To prevent fraud, a booklet security code, which is attached to the book, must be provided to the system. This prevents nefarious people from randomly guessing and registering other sender's labels. As illustrated in the Figures, the system allows the user a wide amount of flexibility as to what mailing events will be reported for mail that has attached to it a tracking label from the sender's registered booklet. The sender may specify default reporting of mail events for all mail that has a booklet tracking label attached thereto. For any specific piece of mail that has a tracking label attached to the mail piece, the sender may specify reporting options that overide the default reporting options previously specified by the sender for the tracking labels in the booklet.

Therefore, the overall operation is as follows:
1. A sender acquires a booklet of labels.
2. The sender removes the tamper evidencing material to use the booklet.
3. The sender obtains the booklet security code.
4. The sender notifies the carrier of the senders booklet security code.
5. The sender, optimally, may overide default mail event reporting options with alternate reporting options.
6. Mail system scans label.
7. Mail system matches label to registered sender.
8. Mail follows registered sender's requests in notification of mailing events for the mail.

If the mail was forwarded, the carrier could send the new address to the sender via email, in some sort of standard address format such as vCard. Furthermore, if the carrier does not or cannot provide that information, a third party operating the system, upon noticing the mail has been forwarded, may look up the old address in a mail forwarding database and provide the new address to the sender utilizing a standard file format such as vCard.

The system also may be extended to allow the registered owner of the booklet of labels, i.e., sender, to "give" a label from his/her booklet to another user of the system and allow that user of the system to "take ownership" of the label. Each individual label has a security label code on it. If Alice gives Bob a label from her previously registered booklet containing a security code, Bob logs into the system, enters the numeric confirmation code of the label in his possession and the security label code, Bob could not have guessed the label security code. The system knows that Bob is now in possession of the label, removes it from Alice's list of previously registered labels, and places it on Bob's list. Of course, the system could allow Alice to assign the label to Bob. The system may also allow Alice to provide Bob's email for a label which was previously registered, which causes tracking information to be sent to Bob as well as, or instead of, Alice.

DETAILED DESCRIPTION OF THE PREFERRED EMBODIMENT

Figure 1:
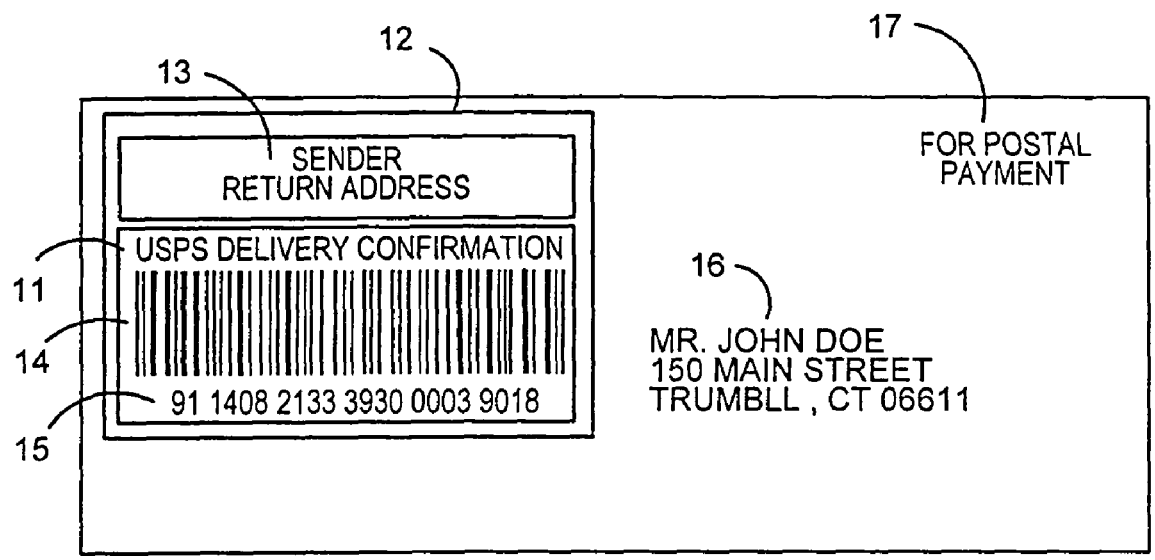
FIG. 1 is a drawing of a prior art label on a mail piece.

Referring now to the drawings in detail, and more particularly to FIG. 1, the reference character 11 represents a prior art label that is attached to mail piece 12. Label 11 has a sender address field 13, a delivery confirmation bar code 14, and a numeric confirmation code 15. Mail piece 12 has a recipient address field 16 and a place for postal payment 17.

Figure 2:
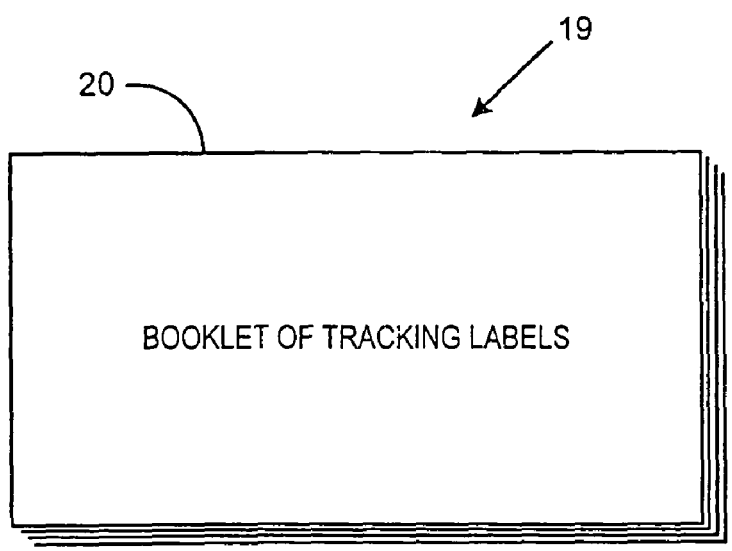
FIG. 2 is a drawing of the cover page of the booklet of labels.

FIG. 2 is a drawing of cover page 20 of the booklet of labels 19. Page 20 is made of an opaque material, i.e., cardboard.

Figure 3:
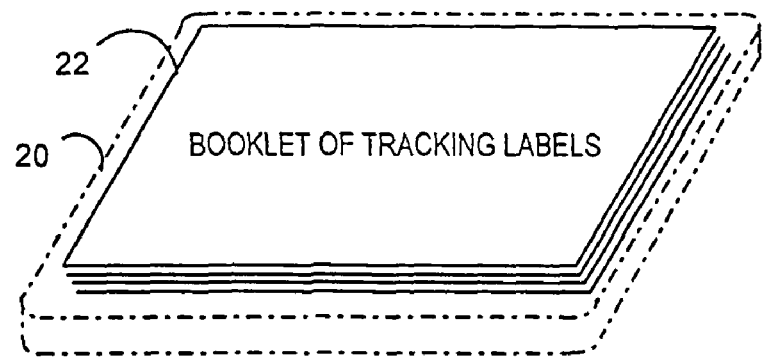
FIG. 3 is a drawing of the booklet of labels contained in a tamper evidencing material.

FIG. 3 is a drawing of booklet of labels 19 contained in a tamper evidencing material. Cover page 20 and sheets 21 are encapsulated with a tamper evidencing material 22, i.e., plastic shrink-wrap.

Figure 4:
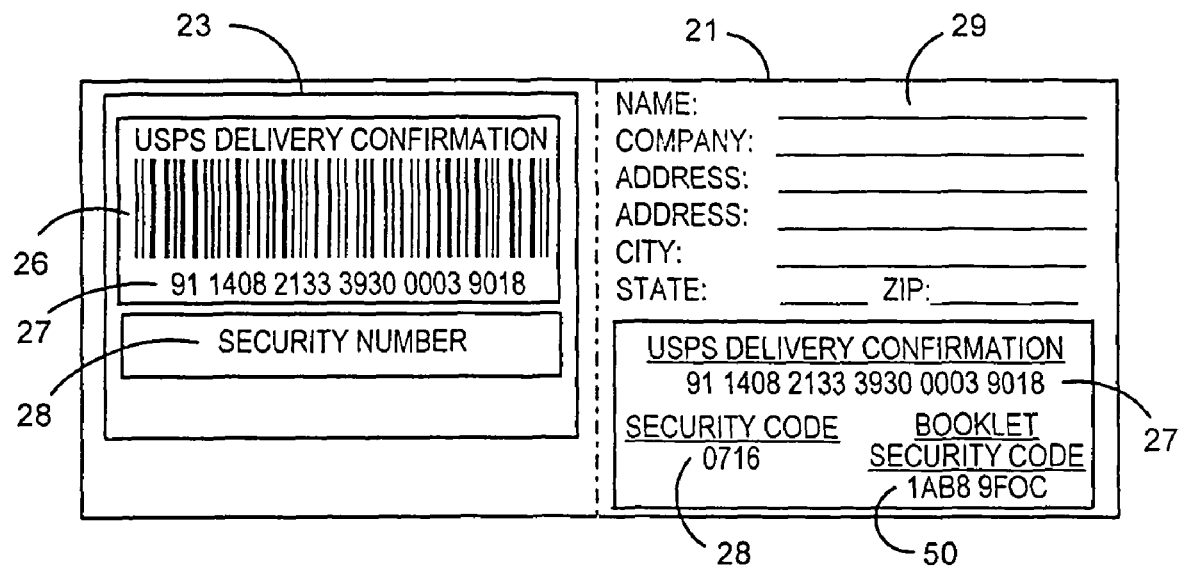
FIG. 4 is a drawing showing one of the labels that is attached to a sheet that is contained within the booklet of labels.

FIG. 4 is a drawing showing one of the labels 23 that is attached to sheet 21 that is contained within booklet of labels 19 (FIG. 2). Label 23 may be removed from sheet 21 by peeling it from Sheet 21. Label 23 has a delivery confirmation bar code 26, a numeric confirmation code 27, and a security code 28. Each label in booklet of labels 19 has a different label security code 28, that are not in sequential order. The security codes 28 may contain alphanumeric characters and be cryptographically generated using known cryptographic algorithms like MD5 (Message Digest 5 which is disclosed in the R. L. Rivest RFC 1321 distributed by the Internet Activities Board in 1992, incorporated herein by reference). Side 29 of sheet 21 includes numeric confirmation code 27, label security code 28, and booklet security code 50. Booklet security code 50 may contain alphanumeric characters. Side 29 also includes space 51 where the sender may enter information into space 51 regarding the intended recipient of the mail piece.

Figure 5:
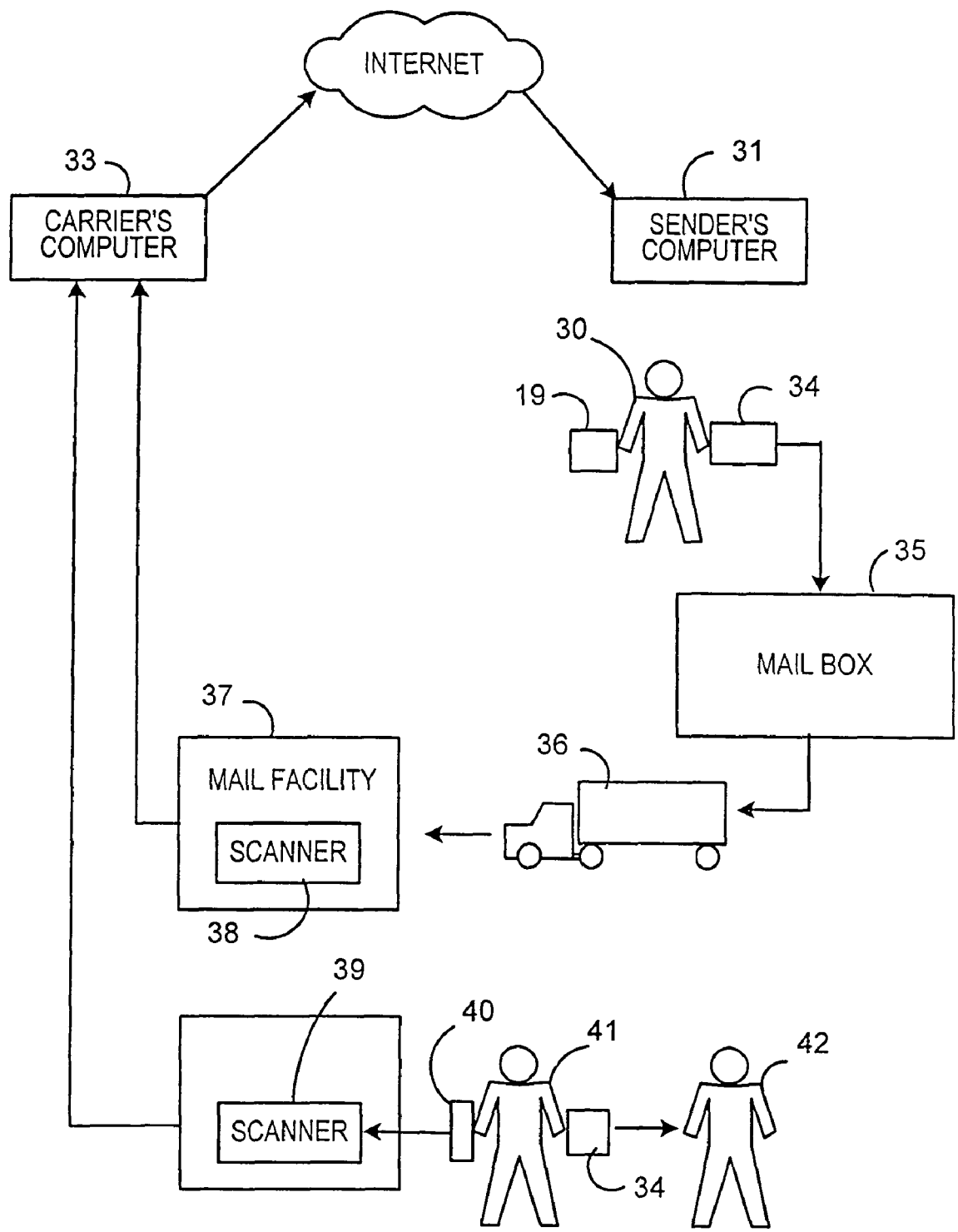
FIG. 5 is s a block diagram showing the process flow of this invention.

FIG. 5 is s a block diagram showing the process flow of this invention. Sender 30 obtains booklet of labels 19 and removes the booklet's tamper evidencing wrapper (shown in FIG. 3). Then the sender goes to sender's computer 31 and notifies carrier's computer 33 via the Internet, of the acquisition of booklet of labels 19 specifying the security booklet code and the sender's name and other sender personal information. It would be obvious to one skilled in the art that the sender may give the carrier the abovementioned information via facsimile, telephone, physical mail, etc. At some point the sender affixes a label 23 (FIG. 4) to mail piece 34 and deposits mail piece 34 in postal receptacle 35.

Carrier truck 36 transfers mail piece 34 to mail acceptance facility 37, and scanner 38 scans the face of mail piece 34 including label 23. The information scanned from mail piece 34, including the time of scanning and the location of scanner 38, is transmitted to carrier computer 33. Carrier computer 33 will notify sender's computer 31 via e-mail of the location and time of scanning. It would be obvious to one skilled in the art that carrier computer 33 may give the sender the location and time of scanning via facsimile, telephone, physical mail, etc., if so requested. Information from other scanners 39 during the delivery process will be sent to the sender via carrier computer 33. Postal deliver agent 41 may scan mail piece 34 with scanner 40 when agent 41 delivers mail piece 34 to recipient 42. The time of scanning and the location of scanner 40 are transmitted to carrier computer 33. Carrier computer 33 will notify sender's computer 31 via e-mail of the location and time of scanning.

Figure 6A:
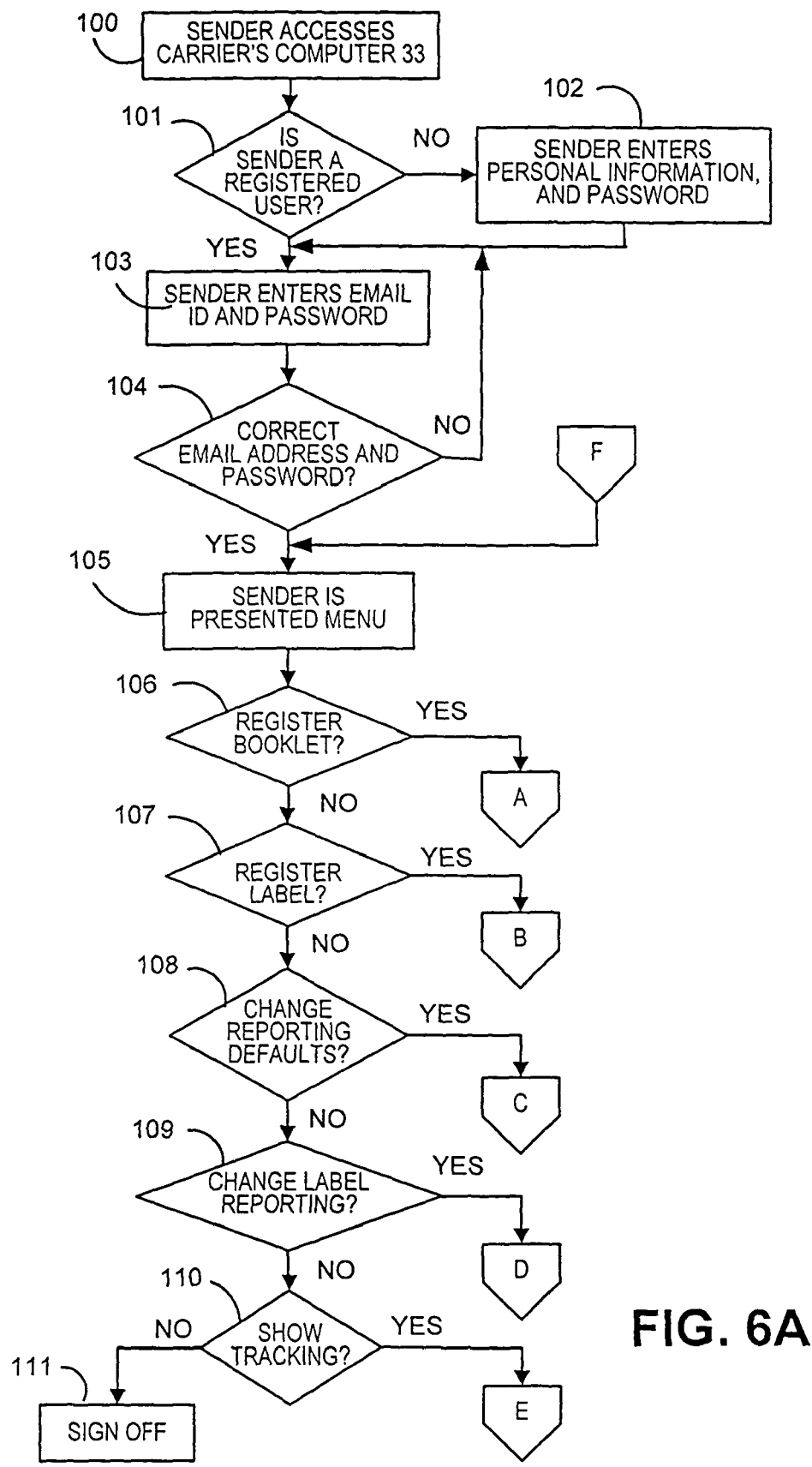
FIGS. 6A-6C is a flow charts showing how booklets of labels are managed.
Figure 6B:
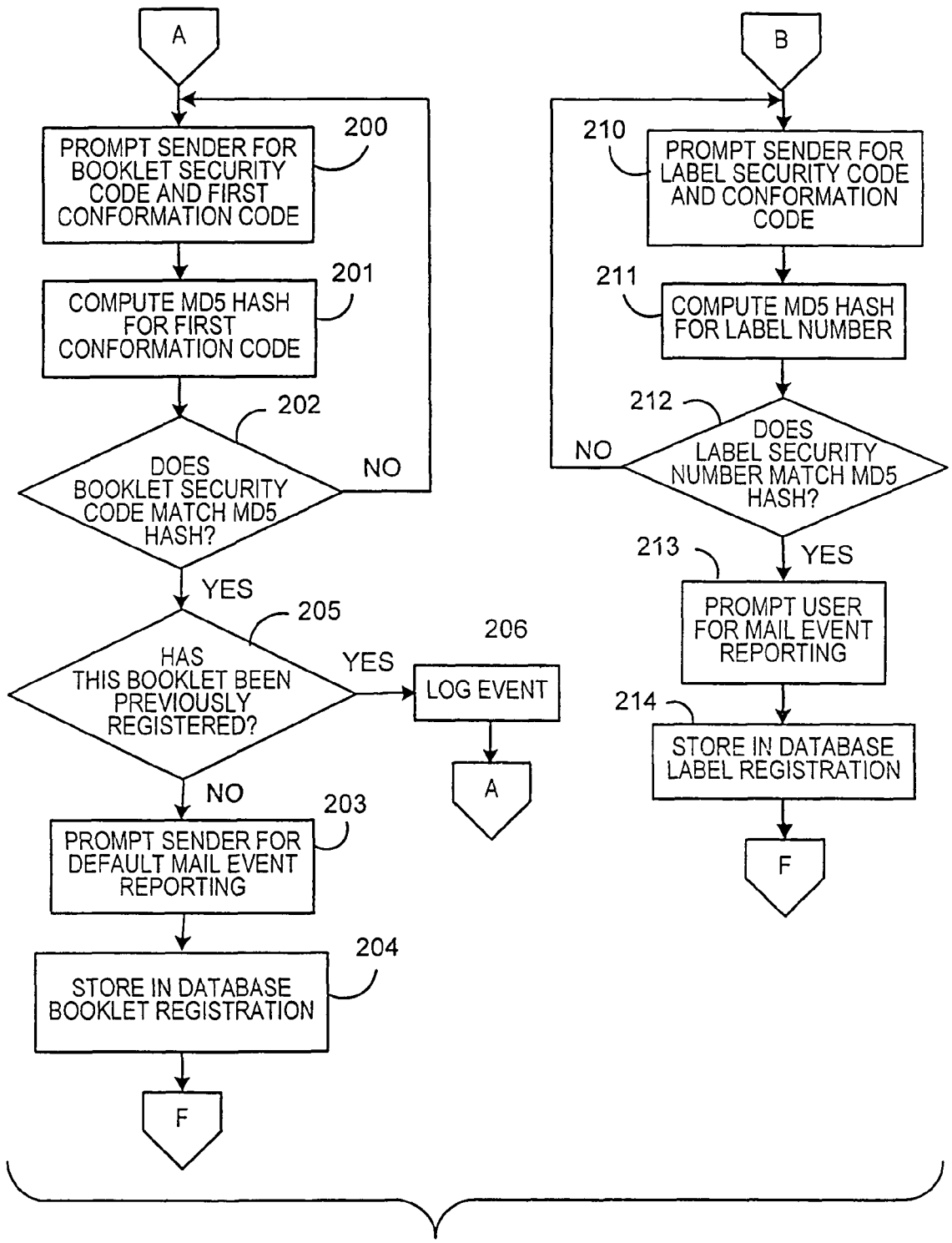
Figure 6C:
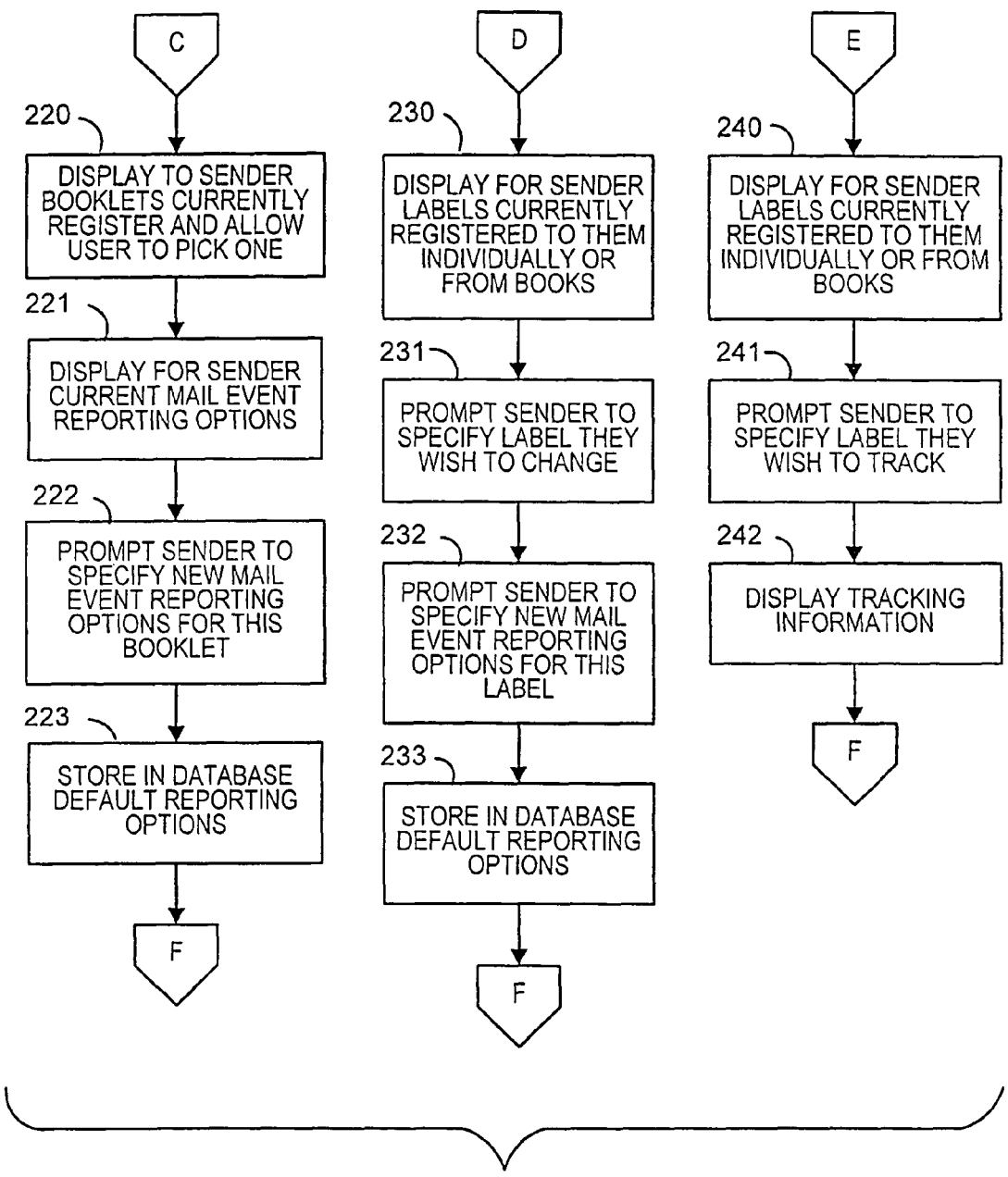

FIGS. 6A-6C is a flow charts showing how booklets of labels are managed. The program begins in block 100 where the sender accesses carrier's computer 33. Then the program goes to decision block 101. Block 101 determines whether the sender is a registered user of the carrier's system. If block 101 determines that the sender is not a registered user, the program goes to block 102. Block 102 prompts the sender to enter personal information and to select a password. After the sender has entered the information requested in block 102, or if block 101 determines that the sender is a registered user, the program goes to block 103. Block 103 asks the sender to enter sender's e-mail address and their password. Now the program goes to decision block 104. Block 104 whether or not the sender entered the proper e-mail address and password. If block 104 determines that the sender did not enter the proper e-mail address and password, the program goes back to the input of block 103. If block 104 determines that the sender entered the proper e-mail address and password, the program goes to block 105. Block 105 presents a menu to the sender, i.e., register booklet, register label, change reporting defaults, change label reporting, and show tracking.

Then the program goes to decision block 106. Decision block 106 determines whether the sender wishes to register booklet 19. If block 106 determines that the sender wishes to register booklet 19, the program goes to block 200 (FIG. 6B). In block 200, carrier computer 33 prompts the sender to enter booklet security code 50 and the first label security code 28 in booklet of labels 19. Then in block 201, computer 33 uses cryptographic algorithm MD5 to compute a hash for the first label security code 28 in booklet of labels 19. Now the program goes to decision block 202. Decision block 202 decides whether booklet security code 50 matches the MD5 hash. If block 202 determines that booklet security code 50 does not match the MD5 hash, the program goes back to block 200. If block 202 determines that booklet security code 50 matches the MD5 hash, the program goes back to block 203 to prompt the sender for default mail event reporting. Now the program goes to decision block 205. Block 205 determines whether booklet 19 has been registered. If block 205 determines that booklet 19 has not been registered, the program goes to the input of block 203. If block 205 determines that booklet 19 has been registered, the program goes to block 206. Block 206 logs the fact that someone is trying to register a previously registered booklet and is attempting to attach the system's integrity. Now the program goes back to block 200. Then the program stores the booklet registration in database 204. Now the program goes back to the input of block 105 (FIG. 6A).

Block 105 presents a menu to the sender, i.e., register booklet, register label, change reporting defaults, change label reporting, and show tracking.

Then the program goes to decision block 106. Decision block 106 determines Whether the sender wishes to register booklet 19. If block 106 determines that the sender does not wish to register booklet 19, the program goes to decision block 107. Block 107 determines whether the sender registered a label. If block 107 determines that the sender wishes to register a label, the program goes to block 210 (FIG. 6B).

In block 210, carrier computer 33 prompts the sender to enter label security code 28 and confirmation code 27. Then in block 211, computer 33 uses cryptographic algorithm MD5 to compute a hash for the label security code 28 on the label that is going to be used in booklet of labels 19. Now the program goes to decision block 212. Decision block 212 decides whether label security code 28 matches the MD5 hash. If block 212 determines that label security code 28 does not match the MD5 hash, the program goes back to block 210. If block 212 determines that label security code 28 matches the MD5 hash, the program goes back to block 213 to prompt the sender for mail event reporting. Then the program stores the label registration in database 214. Now the program goes back to the input of block 105 (FIG. 6A).

Block 105 presents a menu to the sender, i.e., register booklet, register label, change reporting defaults, change label reporting, and show tracking. If block 106 determines that the sender did not wish to register booklet 19 and block 107 determines that the sender did register a label, the program goes to decision block 108. Decision block 108 determines whether the sender wants to change the reporting defaults. If block 108 determines that the sender wants to change the reporting defaults the program goes to block 220 (FIG. 6C). In block 220 information regarding the senders booklet of labels 19 currently registered is displayed on the senders computer screen and the sender is allowed to pick one of the displayed items.

Then in block 221, the sender's current event reporting options are reported, i.e., via e-mail, telephone, facsimile, physical mail, etc for the mail piece that is going to be posted having a label 23 from booklet 19. Now the program goes to block 222 to prompt the sender to specify new reporting options for this booklet of labels 19. Then the program stores the default reporting options in database 223.

Now the program goes back to the input of block 105 (FIG. 6A). If block 106 determines that the sender did not wish to register booklet 19, and block 107 determines that the sender did not wish to register a label, and block 108 determines that the sender does not wish to change reporting defaults, the program goes to decision block 109.

Decision block 109 determines whether the sender wants to change the label reporting. If block 109 determines that the sender wants to change the label reporting, the program goes to block 230 (FIG. 6C). In block 230, information regarding the sender's labels 23 that are currently registered to the sender individually or from booklets 19 is displayed on the sender's computer screen. Then in block 231, the sender is prompted to specify the label sender wishes to change. Now the program goes to block 232 to prompt the sender to specify new reporting options for this label. Then the program goes to block 233 to store the label reporting option in database 233.

At this point the program goes back to the input of block 105 (FIG. 6A). If block 106 determines that the sender did not wish to register booklet 19, and block 107 determines that the sender did not wish to register a label, and block 108 determines that the sender did not wish to change the reporting defaults, and block 109 determines that the sender does not want to change the label reporting, the program goes to decision block 110. Decision block 110 determines whether the sender wants to show tracking.

If decision block 110 determines that the sender wants to show tracking the program goes to block 240 (FIG. 6C). In block 240, information regarding the sender's labels 23 that are currently registered to the sender individually or from booklets 19 is displayed on the sender's computer screen. Then in block 241, the sender is prompted to specify the label sender wishes to track. Now the program goes to block 242 to display tracking information for the sender.

At this point the program goes back to the input of block 105 (FIG. 6A). If block 106 determines that the sender did not wish to register booklet 19, sender did not wish to register a label, and block 108 determines that the sender does not wish to change the reporting defaults, and block 109 determines that the sender does not want to change the label reporting, and block 110 determines that the sender does not want to change the tracking, the program goes to block 111 and signs off.

The above specification describes a new and improved method for tracking mail. It is realized that the above description may indicate to those skilled in the art additional ways in which the principles of this invention may be used without departing from the spirit. Therefore, it is intended that this invention be limited only by the scope of the appended claims.

What is claimed is:

1. A method for tracking mail, comprising the steps of:
    (a) creating a booklet with a booklet security code and a plurality of individual labels that have individual security codes;
    (b) using the booklet security code and one of the label security codes to register the labels in the booklet to a sender;
    (c) allowing the sender to specify how information is to be provided to the sender for tracking mail with the label security codes applied;
    (d) affixing a label containing the label security code to a mail piece;
    (e) allowing the sender to change how information is to be provided to the sender for tracking mail;
    (f) providing information from a mail carrier, specific to the mail piece having the label affixed, to the sender via the Internet.

2. The method claimed in claim 1, wherein a sender provides a label security code and a confirmation code to a tracking system, and the tracking system removes the label security code from a list of previously registered labels after the label has been registered and registers the label security code to a new individual.

3. The method claimed in claim 1 wherein the label security code and booklet security code are inside the booklet which has opaque covers.

4. The method claimed in claim 1, further including the step of: wrapping the booklet with tamper evidencing material.

5. The method claimed in claim 4, wherein the material is a plastic shrink-wrap.

6. The method claimed in claim 1, wherein the booklet security code contains alphanumeric characters.

7. The method claimed in claim 1, wherein the label security code contains alphanumeric characters.

8. The method claimed in claim 1, wherein step (b) further including the step of: determining that the label security code and the booklet security code used to register the booklet was assigned to the booklet being registered.

9. The method claimed in claim 8, further including the step of:
    determining that a cryptographic hash of the label security code matches the booklet security code.

10. The method claimed in claim 9, wherein the cryptographic hash is Message Digest 5.

11. The method claimed in claim 1, wherein step (a), further including the step of: cryptographically generating the label security codes.

12. The method claimed in claim 11, wherein the label security code is a cryptographic hash.

13. The method claimed in claim 1, wherein step (e), further including the step of: scanning the label.

14. The method claimed in claim 1, wherein step (e), further including the step of: scanning the mail piece.

15. The method claimed in claim 1, wherein step (f), further including the step of: providing the sender with date, time and location of the mail piece at periodic intervals in the mail piece delivery.

16. The method claimed in claim 1, wherein step (b), further including the step of: using the label security code on the first label in the booklet to register the labels in the booklet.

17. The method claimed in claim 1, further including the step of: refusing registration of the booklet when the booklet has been previously registered.

18. The method claimed in claim 1, further including the step of: affixing a confirmation code to the label.

* * * * *